United States Patent
Togai

[11] Patent Number: 5,954,782
[45] Date of Patent: Sep. 21, 1999

[54] ENGINE FUEL INJECTION TIMING CONTROL APPARATUS

[75] Inventor: Kazuhide Togai, Tokyo, Japan

[73] Assignee: Mitsubishi Jidosha Kogyo Kabushiki Kaisha, Tokyo, Japan

[21] Appl. No.: 08/981,709

[22] PCT Filed: Jun. 26, 1996

[86] PCT No.: PCT/JP96/01768

§ 371 Date: Dec. 23, 1997

§ 102(e) Date: Dec. 23, 1997

[87] PCT Pub. No.: WO97/02416

PCT Pub. Date: Jan. 23, 1997

[30] Foreign Application Priority Data

Jun. 30, 1995 [JP] Japan ..................... 7-166710

[51] Int. Cl.⁶ .................................................. F02D 41/40
[52] U.S. Cl. .......................................... 701/105; 123/357
[58] Field of Search ..................... 701/105, 102, 701/103; 123/357, 353, 354, 356, 501, 502

[56] References Cited

U.S. PATENT DOCUMENTS

| | | | |
|---|---|---|---|
| 4,476,832 | 10/1984 | Fujimori et al. | 123/357 |
| 4,638,782 | 1/1987 | Yashahura et al. | 123/357 |
| 4,825,369 | 4/1989 | Oshizawa | 701/105 |
| 5,188,084 | 2/1993 | Sekiguchi | 123/502 |
| 5,261,378 | 11/1993 | Fenchel et al. | 123/357 |
| 5,531,204 | 7/1996 | Sekiguchi et al. | 123/501 |

FOREIGN PATENT DOCUMENTS

| | | |
|---|---|---|
| 54A-163224 | 12/1979 | Japan . |
| 56-136141 | 3/1980 | Japan . |
| B2 63-8298 B2 | 2/1988 | Japan . |
| Y263-39394 Y2 | 10/1988 | Japan . |
| B2 1-19059 B2 | 4/1989 | Japan . |
| A1 300037 A1 | 12/1989 | Japan . |
| B3 3-25626 B2 | 4/1991 | Japan . |
| A4 347346 A4 | 12/1992 | Japan . |

Primary Examiner—Willis R. Wolfe
Assistant Examiner—Hieu T. Vo

[57] ABSTRACT

This invention relates to an engine fuel injection timing control apparatus for controlling a fuel injection timing by adjusting the position of a timer piston via a solenoid valve. In this apparatus, a frequency signal switching means (44) selectively outputs a first frequency signal (W1) and a second frequency signal (W2) having a frequency lower than the first frequency signal (W1) according to an engine speed (Ne) detected by an engine rotational speed detecting means (49) with reference to preset signal switching engine rotational speeds ($N_1$, $N_2$, $N_3$, $N_4$, $N_5$). With a driving frequency based on thus outputted frequency signal, a control means (46) duty-controls a timer controlling solenoid valve (39) according to an engine operation state. Here, the signal switching engine rotational speeds ($N_1$, $N_2$, $N_3$, $N_4$, $N_5$) are set to levels which yield first predetermined rotational speed differences ($U_1$, $U_2$, $U_3$, $U_4$, $U_5$) from engine rotational speeds where the resonance is generated with respect to a first frequency ($f_1$) and second predetermined rotational speed differences ($L_1$, $L_2$, $L_3$, $L_4$, $L_5$) from engine rotational speeds where the resonance is generated with respect to a second frequency ($f_2$). Consequently, the fluctuation phenomenon of the timer piston can securely be suppressed in the vicinity of resonance points.

19 Claims, 9 Drawing Sheets $L_1 > U_1$ ---- $N_1$
$L_2 > U_2$ ---- $N_2$
$L_3 > U_3$ ---- $N_3$
$U_4 > L_4$ ---- $N_4$
$L_5 > U_5$ ---- $N_5$ F I G. 8
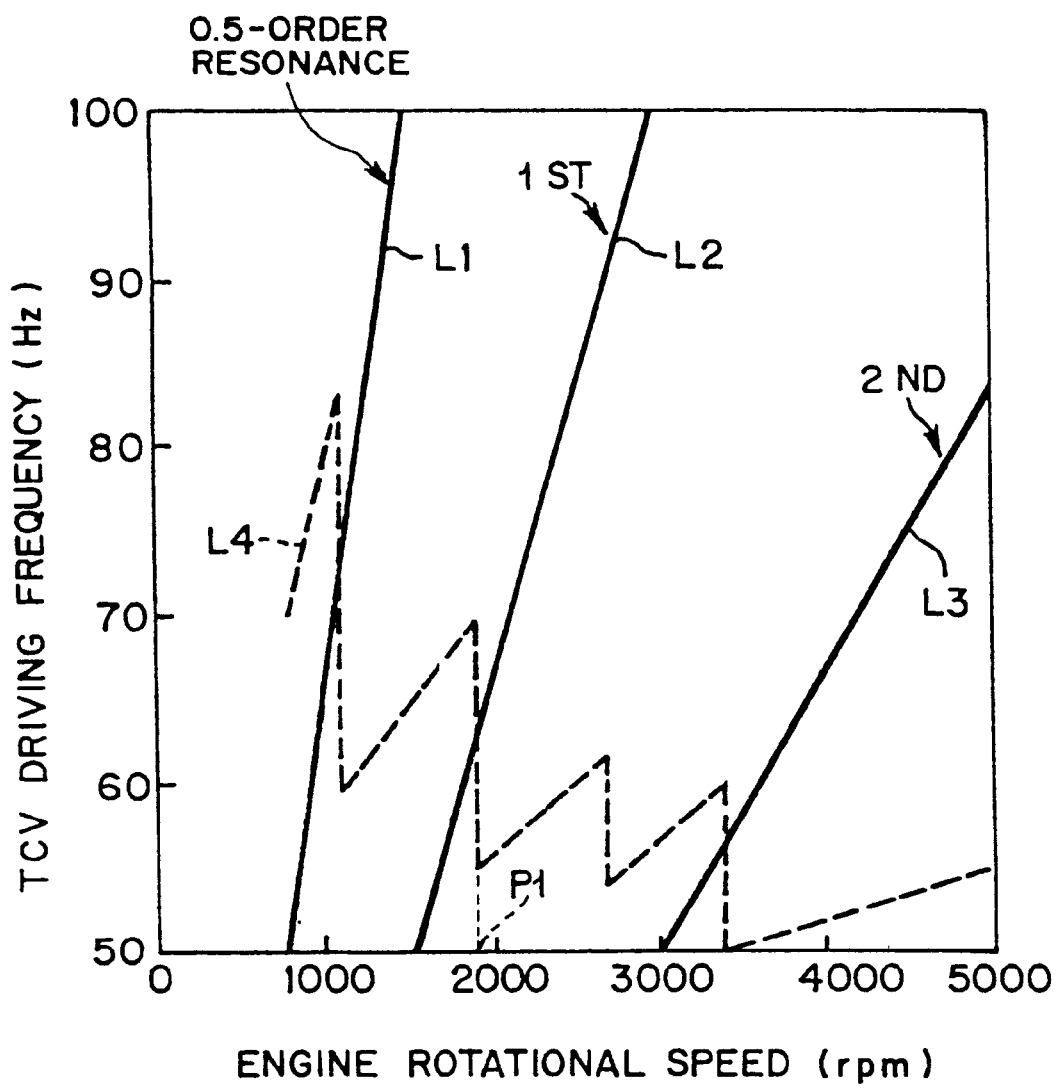

ENGINE FUEL INJECTION TIMING CONTROL APPARATUS

This application claims the benefit under 35 U.S.C. §371 of prior PCT International Application No. PCT/JP96/01768 which has an International filing date of Jun. 26, 1996 which designated the United States of America, the entire contents of which are hereby incorporated by references.

TECHNICAL FIELD

This invention relates to an engine fuel injection timing control apparatus which is suitably used for controlling a fuel injection pump of a diesel engine and, in particular, to an engine fuel injection timing control apparatus which can control a fuel injection timing by adjusting the position of a timer piston via a solenoid valve.

BACKGROUND ART

Known as a fuel injection pump for a diesel engine is the one having a configuration shown in FIG. 4. The fuel injection pump shown in FIG. 4 is a so-called distributor type fuel injection pump based on an electronic control system. In FIG. 4, 10 refers to a pump main body, and a vane type feed pump 11 is disposed within the pump main body 10. Here, as for the feed pump 11, together with its original side view, a front view with an angle of representation changed by 90° is also shown.

The feed pump 11 is rotated by a drive shaft 12 which is actuated as the engine rotates, thereby forcibly feeding fuel from a fuel tank. The fuel emitted from the feed pump 11 is transmitted to a pump chamber 13 within the pump main body 10, and then is supplied therefrom to a fuel forced feed plunger 15 through a passage 14. Inserted into the passage 14 is a fuel cutting magnet valve 16.

The plunger 15 supplies, by way of a communicating hole 17A formed therein, fuel from the passage 14 to a delivery valve 19 through a passage 18, while moving back and forth within a plunger chamber 17 formed in the pump main body 10. Such back and forth movement of the plunger 15 is effected by a cam disc 20 connected to one end of the plunger 15.

Namely, the plunger 15 and the cam disc 20 are rotated by the drive shaft 12 in response to the engine rotation. Also, the cam disc 20 is urged by a spring 21 via the plunger 15, thereby abutting to a roller 23 axially supported by a roller holder 22. Here, the roller holder 22 does not move in the axial direction of the drive shaft 12 and usually (except for the time when rotational phase is being adjusted, which will be explained later) does not rotate around the axis of the drive shaft 12. Consequently, the cam disc 20 moves in the axial direction while being shoved by the roller 23 according to its cam profile. Thus, the plunger 15 moves back and forth, thereby supplying fuel at a desired timing.

Here, each cylinder is provided with the passage 18 and the delivery valve 19. For example, in the case of a four-cylinder engine, four pieces each of passages 18 and delivery valves 19 are provided.

As shown in FIGS. 5, the roller holder 22 is provided with a plurality of rollers 23 (which are four here), and the cam disc 20 has a cam profile corresponding thereto. Consequently, as the cam disc 20 makes one revolution, the plunger 15 is driven four times, whereby, for example, fuel is successively supplied to four cylinders respectively in response to these four driving operations of the plunger 15.

Here, provided for fuel injection amount control are a control sleeve 24, which moves back and forth on the outer periphery of the plunger 15 so as to adjust the forced feed stroke of the plunger 15, and a governor (electric governor here) 25 for controlling the control sleeve 24.

Further, in FIG. 4, 26 is a regulator valve, 27 is a sensing gear plate for detecting the rotational speed of the drive shaft 12, 28 is a fuel temperature sensor, and 29 is an overflow valve, provided with a check valve, for returning excess fuel within the pump chamber 13 to the fuel tank.

In order to control the fuel injection timing, such a fuel injection pump is provided with a timer 30. The timer 30 is equipped with a timer piston 31 for changing the position of the roller 23 in its rotating direction. Here, for convenience, the timer piston 31 is also depicted by a front view whose angle of representation is changed by 90°.

As shown in FIGS. 4, 5(A), and 5(B), the timer piston 31 minutely rotates the roller holder 22 via a piston pin 33 while moving back and forth within a cylinder 32 formed in the pump main body 10.

Namely, the timer piston 31 has an intermediate portion to which the piston pin 33 is connected, one end provided with a first pressure chamber 34 into which the fuel pressure within the pump chamber 13 is introduced, and the other end provided with a second pressure chamber 35 into which the intake-side fuel pressure (fuel pressure upstream the feed pump 11) is introduced.

Also, the timer piston 31 is provided with a passage 36 through which the pump chamber 13 and the first pressure chamber 34 communicate with each other, and the passage 36 is formed with an orifice 37. Further, disposed within the second pressure chamber 35 is a timer spring 38 for urging the timer piston 31 toward the one end (toward the first pressure chamber 34).

Hence, the position of the timer piston 31 is determined according to the balance among the fuel pressure within the first pressure chamber 34, the fuel pressure within the second pressure chamber 35, and the urging force of the timer spring 38. For example, when the fuel pressure within the first pressure chamber 34 becomes higher than that in the state shown in FIG. 5(A), the timer piston 31 moves to the left in the drawing as shown in FIG. 5(B), whereby the fuel injection timing is adjusted to the advancing side. When the fuel pressure within the first pressure chamber 34 becomes low, by contrast, the timer piston 31 moves to the right in the drawing, whereby the fuel injection timing is adjusted to the retarding side.

For example, when the rotational speed of the engine becomes high, the output pressure from the feed pump 11 increases, whereby the fuel pressure within the pump chamber 13 also increases, thus yielding a high pressure within the first pressure chamber 34. Consequently, the timer piston 31 moves to the left in the drawing, so that the fuel injection timing is adjusted to the advancing side.

Further, as shown in FIG. 4, disposed in the case of this pump is a timing control valve (TCV) 39 which can adjust the pressure balance between the first pressure chamber 34 side and the second pressure chamber 35 side, whereby the fuel injection timing can be adjusted on the basis of various parameters.

Namely, the timing control valve 39 is a solenoid valve of electronic control type, whose opening (valve opening time per unit time) is adjusted by duty control. Accordingly, as the timing control valve 39 is duty-controlled, the pressure difference between the pressure on the first pressure chamber 34 side and the pressure on the second pressure chamber 35 side is appropriately adjusted (to the reducing side here) according to the opening of the valve 39, thus regulating the position of the timer piston 31, whereby the fuel injection timing is adjusted.

Such driving of the timing control valve 39 is effected by a non-depicted timing control valve driver (TCV driver), whose operation is controlled by a non-depicted controller according to a target fuel injection amount Q and an engine rotational speed (i.e., number of engine revolution per unit time, which will be hereinafter referred to as engine speed) Ne.

In the case where the timing control valve 39 is duty-controlled, such control is effected while driving current pulses are emitted at a predetermined frequency. When this driving frequency approaches an integral multiple of the engine speed, the fuel injection timing may fluctuate. This phenomenon is known as "fluctuation," which is supposed to be a phenomenon of so-called "beats" caused by interference of two different frequencies close to each other.

For example, FIG. 6 shows experimental data concerning this fluctuation phenomenon, in which results of an experiment under a condition where the engine speed Ne is in the vicinity of 1,800 rpm and the driving frequency of the timing control valve 39 is 60 Hz. In FIG.6, the abscissa and ordinate respectively indicate time and position of the timer piston 31 (TPS), whereas curve S indicates a fluctuation characteristic of the TPS, from which it can be seen that the TPS is vibrating with a relatively long period (about 1 second).

It is supposed that, while the driving frequency of the timing control valve 39, i.e., 60 Hz, becomes just twice that of the engine speed Ne when the latter is exactly 1,800 rpm (=30 Hz), such a phenomenon as "beats" occurs due to the fact that the engine speed Ne is close to but not exactly 1,800 rpm.

Thus simulated is a case where the engine speed Ne is 1,700 rpm (=29.5 Hz) while the driving frequency of the timing control valve 39 is set to 60 Hz, which yields, as shown in FIG. 7, a characteristic substantially the same as the experimental results shown in FIG. 6.

When the orifice 37 constantly acts, and the opening of the timing control valve 39 is kept constant, the inflow/outflow of fuel in the individual pressure chambers 34 and 35, i.e., the position of the timer piston 31, is ruled by the pressure difference between both ends of the timer piston 31. Accordingly, changes in pressure difference are supposed to cause the fluctuation (i.e., displacement of the timer piston 31).

Further, presumed to be factors for changes in pressure difference are pressure changes in the pump chamber 13 and pressure changes in the cylinder 32 of the timer piston 31.

The pressure may change in the pump chamber 13 due to changes in the discharge pressure of the feed pump 11, spills of the fuel forcibly fed by the plunger 15, and the like. Also, the pressure may change in the timer piston cylinder 32 due to the fact that the reaction force generated when the cam disc 20 runs over the roller 23 is transmitted through the piston pin 33, due to the resonance generated between the mass of the timer piston 31 and the elastic property of the timer spring 38, and the like.

Among them, particularly influential is the reaction force generated by the cam disc when it runs over. Simply put, this reaction force is twice as influential as the change in pressure of the pump chamber 13, since the inflow pressure changes at both ends of the timer piston 31 (i.e., in both pressure chambers 34 and 35) when the cam disc runs over. Also, it can be considered most influential since the forced pressure acting on the timer piston 31 itself fluctuates greatly. In the case of a four-cylinder engine, the reaction force generated by the cam disc when it runs over has a frequency twice that of the engine speed Ne and a substantially constant amplitude.

In order to eliminate such a fluctuation phenomenon, the following means can be considered:

(1) Namely, as indicated by lines L1, L2, and L3 in FIG. 8, the driving frequency of the timing control valve 39 is completely synchronized with a resonance point with respect to the engine rotation, i.e., the engine speed Ne, the level twice as high as the engine speed Ne (=2Ne), or the level four times as high as the engine speed Ne (=4Ne). This technique is disclosed, for example, in Japanese Patent Publication No. SHO 63-8298.

(2) The driving frequency of the timing control valve 39 is prevented from approaching the resonance point with respect to the engine rotation, i.e., the engine speed Ne, 2Ne, or 4Ne, while being changed with respect to the engine speed Ne like sawteeth as indicated by dotted line L4 in FIG. 8. This technique is disclosed, for example, in Japanese Patent Publication No. HEI 1-19059.

These means are based on a characteristic in which the greater is the frequency difference between the timing control valve and the engine, the smaller becomes the fluctuation (piston amplitude). In FIG. 9, a characteristic indicated by Ne refers to a case in the vicinity of the 0.5-order resonance point, i.e., where the driving frequency of the timing control valve is set near the engine speed Ne; that indicated by 2*Ne refers to a case in the vicinity of the first-order resonance point, i.e., where the driving frequency of the timing control valve is set near the level twice as high as that of the engine speed Ne; and that indicated by 4*Ne refers to a case in the vicinity of the second-order resonance point, i.e., where the driving frequency of the timing control valve is set near the level four times as high as that of the engine speed Ne.

Regarding the solving means (1), the above-mentioned Japanese Patent Publication No. SHO 63-8298 relates to a technique in which the operating frequency of an opening/closing valve (timing control valve) is controlled, according to the fuel feed pressure, so as to become an integral multiple (e.g., twice that) of the engine speed, thereby synchronizing the operating period of the opening/closing valve with the pressure-changing period in the fuel feed pressure, thus decreasing the fluctuation in fuel feedpressure and accurately controlling the fuel injection timing.

In this technique, however, since the fuel feed pressure is detected so as control the operation of the opening/closing valve on the basis of thus detected pressure, there are disadvantages as follows:

First, as to the above-mentioned fluctuation phenomenon, the control based on the fuel feed pressure is not always appropriate since the fuel feed pressure is relatively less influential.

Also, the timing for starting the driving of the opening/closing valve changes every time the fuel injection timing changes, thus complicating the setting for the timing for terminating the driving of the opening/closing valve (i.e., duty width). When the driving terminating timing for the opening/closing valve is to be synchronized with the rotational phase, on the other hand, the driving starting timing for the opening/closing valve cannot be set correctly, whereby the opening control of the opening/closing valve (i.e., duty control) cannot be achieved.

Further, there is needed a contrivance for synchronizing the signal based on the detected fuel feed pressure with the crank angle of the engine. It is due to the fact that the rise of fuel feed pressure synchronizes with the injection timing but does not relate to the crank angle, and that the fall of fuel feed pressure depends on the amount of injection but does not relate to the crank angle either.

In the technique of (2), while a plurality of driving frequencies are selected according to the engine speed (rotational speed), the effect of suppressing the fluctuation phenomenon cannot securely be obtained unless points for switching the driving frequencies are appropriately set.

For example, in a switching point P1 within the first-order resonance region in the vicinity of the line L2 in FIG. 8, the driving period of the timing control valve and the engine speed approach the first-order resonance region, whereby the above-mentioned fluctuation phenomenon tends to occur greatly. It is due to the fact that the piston amplitude caused by fluctuation becomes greater in the first-order resonance region.

Namely, as indicated by the characteristic line 2*Ne in FIG. 9, the piston amplitude in the vicinity of the first-order resonance is substantially twice as large as that in the vicinity of the 0.5-order resonance (characteristic line Ne) and nearly four times as large as that in the vicinity of the second-order resonance (characteristic line 4*Ne).

Thus, the greater the piston amplitude is, the lower becomes the accuracy in controlling the fuel injection timing. Accordingly, the fluctuation phenomenon in the first-order resonance region should be eliminated in particular. The prior art has conceived no particular means against such fluctuation in the first-order resonance region, thus failing to securely attain the effect of suppressing the fluctuation phenomenon.

Though Japanese Patent Application Laid-Open (Kokai) Nos. HEI 1-300037 and 4-347346, and Japanese Patent Publication No. HEI 3-25626 each disclose a technique concerning the fuel injection timing control for engines such as diesel engine, they fail to specifically take account of the fluctuation phenomenon such as that mentioned above and cannot appropriately eliminate such fluctuation phenomenon.

In view of the problems mentioned above, it is an object of the present invention to provide, in an apparatus which can control a fuel injection timing by adjusting the position of a timer piston via a solenoid valve, an engine fuel injection timing control apparatus which can securely attain an effect of suppressing the fluctuation phenomenon, thus allowing the fuel injection timing to be controlled appropriately.

DISCLOSURE OF THE INVENTION

To this end; in an engine fuel injection control apparatus comprising a timer for changing a fuel injection timing of an engine injecting fuel from a fuel injection valve by moving a timer piston in response to an oil pressure supplied thereto and a timer controlling solenoid valve for adjusting the oil pressure supplied to the timer as being opened and closed by a driving signal having a duty cycle which is set according to an operation state of the engine, in which a resonance occurring in the timer piston between driving by the timer controlling solenoid valve and a fluctuation accompanying a rotation of the engine is eliminated by a change in frequency of the driving signal of the timer controlling solenoid valve; the engine fuel injection timing control apparatus of the present invention comprises first frequency signal generating means for generating and emitting a signal having a first frequency, second frequency signal generating means for generating and emitting a signal having a second frequency which is lower than the first frequency, engine rotational speed detecting means for detecting a rotational speed of the engine, frequency signal switching means for selectively outputting the first frequency signal emitted from the first signal generating means and the second frequency signal emitted from the second signal generating means according to the engine rotational speed detected by the engine rotational speed detecting means, and control means, having a driving frequency based on the frequency signal outputted from the frequency signal switching means, for controlling the timer controlling solenoid valve by using the driving signal having the duty cycle that is set according to the operation state of the engine, wherein the frequency signal switching means is configured so as to change over between the first frequency signal and the second frequency signal according to a preset signal switching engine rotational speed, and wherein the signal switching engine rotational speed is set to a level which yields a first predetermined rotational speed difference from an engine rotational speed where the resonance is generated with respect to the first frequency and a second predetermined rotational speed difference from an engine rotational speed where the resonance is generated with respect to the second frequency.

Due to such a configuration, the fuel injection timing from the fuel injection valve is adjusted when the timer moves the timer piston. Here, the timer piston operates while the oil pressure supplied thereto is adjusted by the timer controlling solenoid valve that is being duty-controlled. While a driving force is periodically supplied from the timer controlling solenoid valve to the timer piston, a pressure change accompanying the engine rotation is added thereto, whereby a resonance occurs between the driving by the timer controlling solenoid valve and the fluctuation (pressure change) accompanying the engine rotation. Accordingly, the frequency of the driving signal of the timer controlling solenoid valve is changed so as to prevent such a resonance state from occurring.

Namely, the frequency signal switching means selectively outputs the first frequency signal emitted from the first signal generating means and the second frequency signal emitted from the second signal generating means according to the engine rotational speed detected by the engine rotational speed detecting means with reference to the preset signal switching engine rotational speed, and the control means controls the driving of the timer controlling solenoid valve in response to thus outputted frequency signal.

Here, since the signal switching engine rotational speed is set to a level which yields a first predetermined rotational speed difference from an engine rotational speed where the resonance is generated with respect to the first frequency and a second predetermined rotational speed difference from an engine rotational speed where the resonance is generated with respect to the second frequency, the fluctuation (beats) or resonance of the timer piston can be eliminated in the case where the engine rotational speed approaches the first or second frequency. Consequently, changes in fuel injection timing due to the fluctuation of the timer piston can be suppressed, whereby the fuel injection timing can be accurately controlled, thus contributing to improving engine performances.

Here, the first and second predetermined rotational speed differences may be either identical to or different from each other.

Also preferably, the signal switching engine rotational speed is disposed between a first-order resonance region which is an engine rotational speed region where the resonance becomes a first-order resonance and a secondorder resonance region which is an engine rotational speed region where the resonance becomes a second-order resonance, and the frequency signal switching means outputs the second and first frequency signals respectively in an engine rotational speed region on the first-order resonance region side of the signal switching engine rotational speed and in an engine rotational speed region on the second-order resonance region side of the signal switching engine rotational speed.

Consequently, the fluctuation or resonance of the timer piston in the first-order and second-order resonance regions can be eliminated.

Preferably, in this case, the signal switching engine rotational speed is set such that a rotational speed difference from a first-order resonance engine rotational speed where the first-order resonance occurs with respect to the first frequency is greater than a rotational speed difference from a second-order resonance engine rotational speed where the second-order resonance occurs with respect to the second frequency.

Consequently, the fluctuation or resonance of the timer piston can be eliminated efficiently in the first-order resonance region where the demand for suppressing the fluctuation or resonance is relatively high.

Also preferably, the signal switching engine rotational speed is disposed between a 0.5-order resonance region which is an engine rotational speed region where the resonance becomes a 0.5-order resonance and a first-order resonance region which is an engine rotational speed region where the resonance becomes a first-order resonance, and the frequency signal switching means outputs the second and first frequency signals respectively in an engine rotational speed region on the 0.5-order resonance region side of the signal switching engine rotational speed and in an engine rotational speed region on the first-order resonance region side of the signal switching engine rotational speed.

Consequently, the fluctuation or resonance of the timer piston in the first-order and 0.5-order resonance regions can be eliminated.

Preferably, in this case, the signal switching engine rotational speed is set such that a rotational speed difference from a first-order resonance engine rotational speed where the first-order resonance occurs with respect to the second frequency is greater than a rotational speed difference from a 0.5-order resonance engine rotational speed where the 0.5-order resonance occurs with respect to the first frequency.

Consequently, the fluctuation or resonance of the timer piston can be eliminated efficiently in the first-order resonance region where the demand for suppressing the fluctuation or resonance is relatively high.

Also preferably, the signal switching engine rotational speed is disposed between a first N-order resonance engine rotational speed where an N-order resonance is generated with respect to the first frequency and a second N-order resonance engine rotational speed where an N-order resonance is generated with respect to the second frequency, and the frequency signal switching means outputs the first and second frequency signals respectively in an engine rotational speed region on the lower rotational speed region side of the signal switching engine rotational speed and in an engine rotational speed region on the higher rotational speed region side of the signal switching engine rotational speed.

Consequently, the fluctuation or resonance of the timer piston in the N-order resonance regions can securely be eliminated.

Preferably, in this case, the signal switching rotational speed is set such that a rotational speed difference from the second N-order resonance engine rotational speed is greater than a rotational speed difference from the first N-order resonance engine rotational speed.

Consequently, in the case of the same-order resonance regions, the second frequency signal of a lower driving frequency attains a margin concerning the engine rotational speed difference greater than that of the first frequency of a higher driving frequency, whereby the fluctuation or resonance can be eliminated efficiently in the case of a lower frequency where it is likely to occur with a greater amplitude.

Preferably, the N is an integer or 0.5.

Also preferably, the signal switching engine rotational speed comprises a first signal switching engine rotational speed disposed between a first-order resonance region which is an engine rotational speed region where the resonance becomes a first-order resonance and a second-order resonance region which is an engine rotational speed region where the resonance becomes a second-order resonance, and a second signal switching engine rotational speed disposed between a 0.5-order resonance region which is an engine rotational speed region where the resonance becomes a 0.5-order resonance and a first-order resonance region which is an engine rotational speed region where the resonance becomes a first-order resonance; and the frequency signal switching means outputs the second frequency signal in an engine rotational speed region on the first-order resonance region side of the first signal switching engine rotational speed and in an engine rotational speed region on the 0.5-order resonance region side of the second signal switching engine rotational speed, and outputs the first frequency signal in an engine rotational speed region on the second-order resonance region side of the first signal switching engine rotational speed and in an engine speed region on the first-order resonance region side of the second signal switching engine rotational speed.

Consequently, the fluctuation or resonance of the timer piston in the first-order, 0.5-order, and second-order resonance regions can be eliminated.

Further preferably, in this case, the first signal switching engine rotational speed is set such that a rotational speed difference from a first-order resonance engine rotational speed where the first-order resonance occurs with respect to the first frequency is greater than a rotational speed difference from a second-order resonance engine rotational speed where the second-order resonance occurs with respect to the second frequency, and the second signal switching rotational speed is set such that a rotational speed difference from a first-order resonance engine rotational speed where the first-order resonance occurs with respect to the second frequency is greater than a rotational speed difference from a 0.5-order resonance engine rotational speed where the 0.5-order resonance occurs with respect to the first frequency.

Consequently, while the fluctuation or resonance of the timer piston is efficiently eliminated in the first resonance region where the demand for suppressing the fluctuation or resonance is relatively high, the fluctuation or resonance of the timer piston can be eliminated in the 0.5-order and second-order resonance regions as well as in the first-order resonance region.

Also preferably, the signal switching engine rotational speed comprises a first signal switching engine rotational speed disposed between a first-order resonance region which is an engine rotational speed region where the resonance becomes a first-order resonance and a second-order resonance region which is an engine rotational speed region where the resonance becomes a second-order resonance, a second signal switching engine rotational speed disposed between a 0.5-order resonance region which is an engine rotational speed region where the resonance becomes a 0.5-order resonance and a first-order resonance region which is an engine rotational speed region where the resonance becomes a first-order resonance, a third signal switching engine rotational speed disposed between a first 0.5-order resonance engine rotational speed where a 0.5-order resonance is generated with respect to the first frequency and a second 0.5-order resonance engine rotational speed where a 0.5-order resonance is generated with respect to the second frequency, a fourth signal switching engine rotational speed disposed between a first first-order resonance engine rotational speed where a first-order resonance is generated with respect to the first frequency and a second first-order resonance engine rotational speed where a first-order resonance is generated with respect to the second frequency, and a fifth signal switching engine rotational speed disposed between a first second-order resonance engine rotational speed where a second-order resonance is generated with respect to the first frequency and a second second-order resonance engine rotational speed where a second-order resonance is generated with respect to the second frequency; and the frequency signal switching means outputs the second frequency signal in an engine rotational speed region between the third and second signal switching engine rotational speeds and in an engine rotational speed region between the fourth and first signal switching engine rotational speeds, and outputs the first frequency signal in an engine rotational speed region between the second and fourth signal switching engine rotational speeds and an engine rotational speed region between the first and fifth signal switching engine rotational speeds.

Consequently, the fluctuation or resonance of the timer piston in the first-order, 0.5-order, and second-order resonance regions can securely be eliminated.

Preferably, in this case, the first signal switching engine rotational speed is set such that a rotational speed difference from a first-order resonance engine rotational speed where the first-order resonance occurs with respect to the first frequency is greater than a rotational speed difference from a second-order resonance engine rotational speed where the second-order resonance occurs with respect to the second frequency, the second signal switching rotational speed is set such that a rotational speed difference from a first-order resonance engine rotational speed where the first-order resonance occurs with respect to the second frequency is greater than a rotational speed difference from a 0.5-order resonance engine rotational speed where the 0.5-order resonance occurs with respect to the first frequency, the third signal switching rotational speed is set such that a rotational speed difference from the second 0.5-order resonance engine rotational speed is greater than a rotational speed difference from the first 0.5-order resonance engine rotational speed, the fourth signal switching rotational speed is set such that a rotational speed difference from the second first-order resonance engine rotational speed is greater than a rotational speed difference from the first first-order resonance engine rotational speed, and the fifth signal switching rotational speed is set such that a rotational speed difference from the second second-order resonance engine rotational speed is greater than a rotational speed difference from the first second-order resonance engine rotational speed.

Consequently, while the fluctuation or resonance of the timer piston is efficiently eliminated in the first resonance region where the demand for suppressing the fluctuation or resonance is relatively high, and while the second frequency signal of a lower driving frequency attains a margin concerning the engine rotational speed difference greater than that of the first frequency of a higher driving frequency, thus efficiently suppressing the fluctuation or resonance of the timer piston in the case of a lower frequency where greater suppression is desired, the fluctuation or resonance of the timer piston in the 0.5-order and second-order resonance regions can be eliminated as well as in the first-order resonance region.

Further preferably, the frequency signal switching means outputs the first frequency signal in an engine rotational speed region on the lower rotational speed side of the third signal switching engine rotational speed.

Consequently, the fluctuation or resonance of the timer piston in the 0.5-order resonance can securely be eliminated in lower engine rotational speed regions.

Further preferably, the frequency signal switching means outputs the second frequency signal in an engine rotational speed region on the higher rotational speed side of the fifth signal switching engine rotational speed.

Consequently, the fluctuation or resonance of the timer piston in the second-order resonance can securely be eliminated in higher engine rotational speed regions.

BRIEF DESCRIPTION OF THE DRAWINGS

FIG. 8 is a view showing the prior art while illustrating a relationship between the driving frequency of a timing control valve and the engine rotation.

BEST MODES FOR CARRYING OUT THE INVENTION

With reference to the drawings, embodiments of the present invention will be explained hereinafter.

Figure 1:
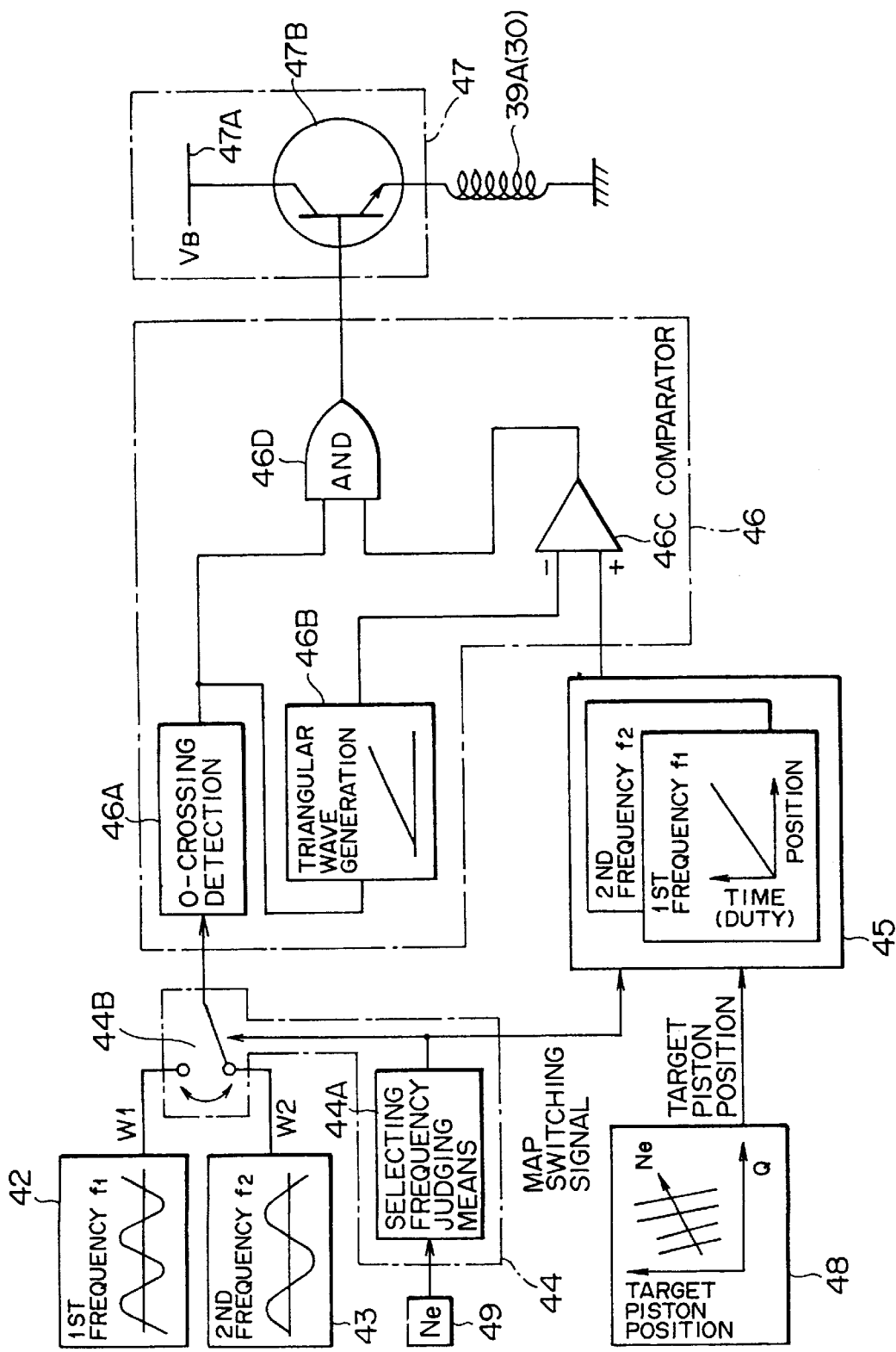
FIG. 1 is a control block diagram showing the configuration of main parts of an engine fuel injection timing control apparatus in accordance with an embodiment of the present invention.
Figure 2:
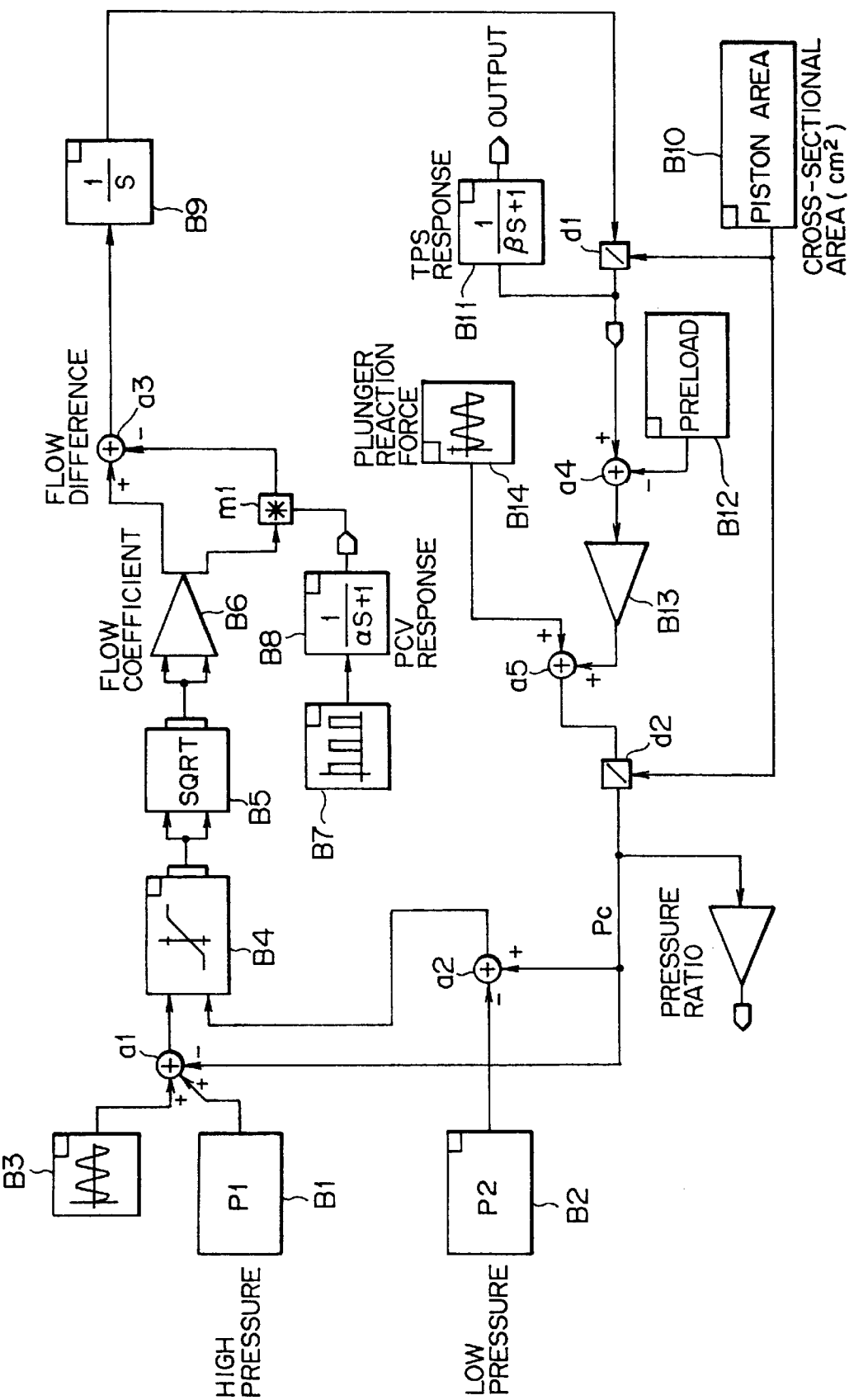
FIG. 2 is a view showing a driving control model of a timer piston concerning the engine fuel injection timing control apparatus in accordance with an embodiment of the present invention.
Figure 3:
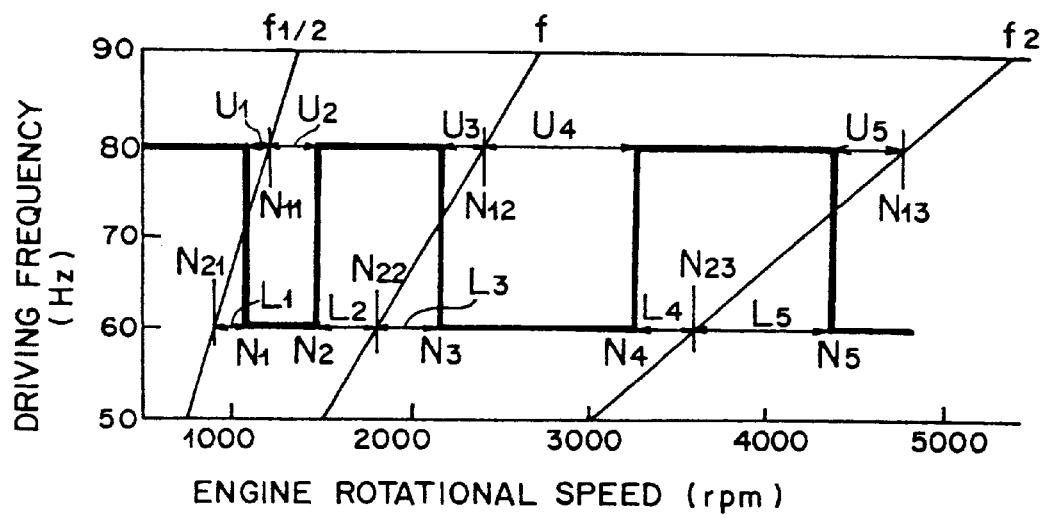
FIG. 3 is a view for explaining operations of the engine fuel injection timing control apparatus in accordance with an embodiment of the present invention.
Figure 4:
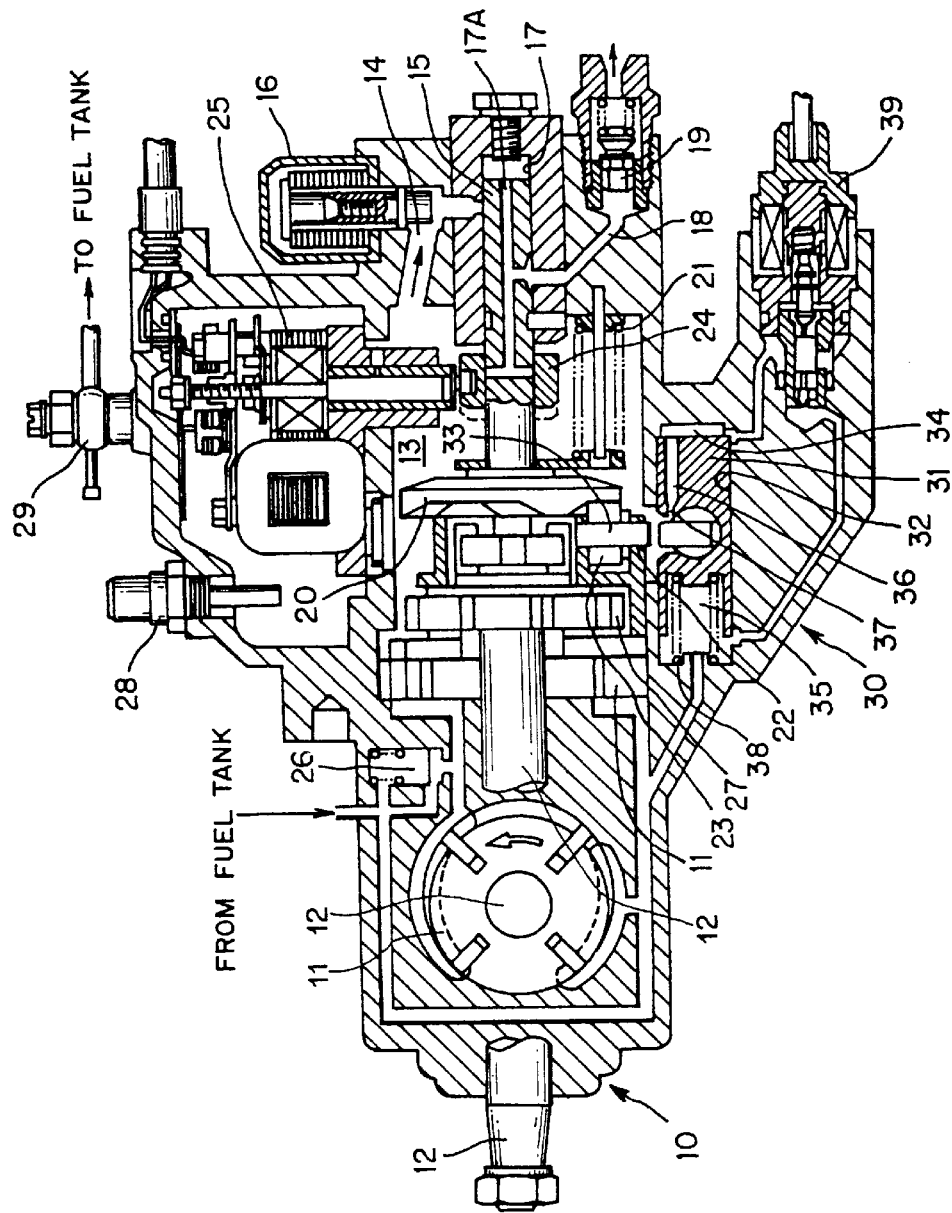
FIG. 4 is a sectional view showing a fuel injection pump of a diesel engine.
Figure 5A:
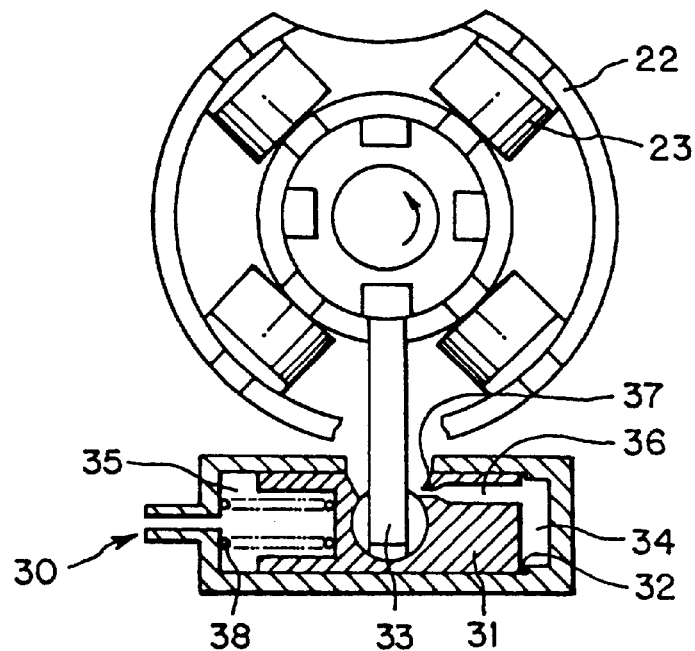
FIG. 5(A) is a sectional view showing a timer of the fuel injection pump of the diesel engine in a state before the fuel injection timing is adjusted to the advancing side.
Figure 5B:
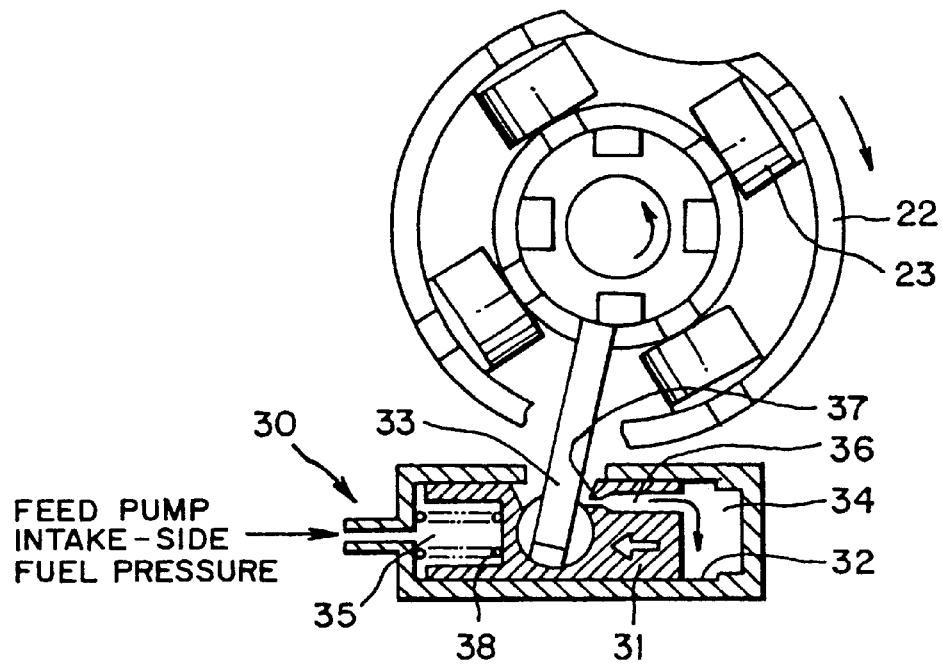
FIG. 5(B) is a sectional view showing a timer of the fuel injection pump of the diesel engine in a state after the fuel injection timing is adjusted to the advancing side.
Figure 6:
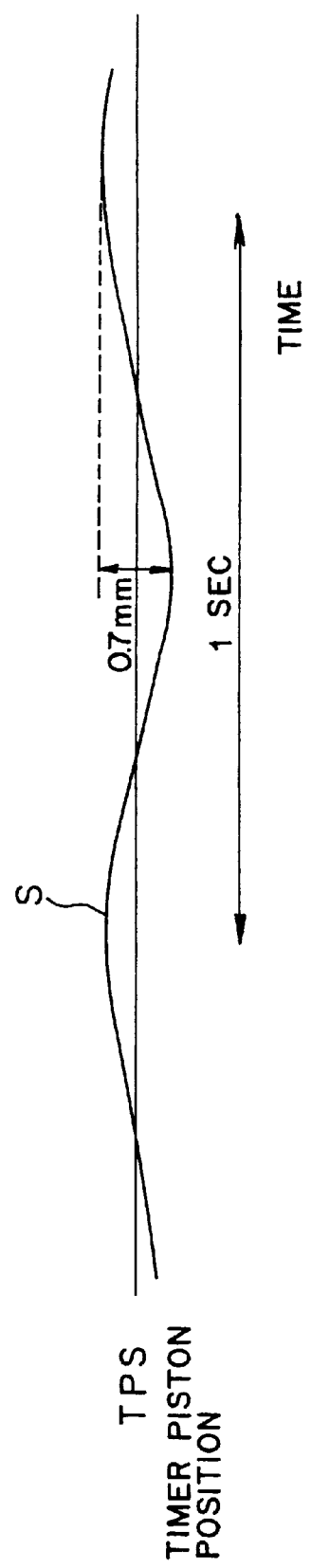
FIG. 6 is a graph showing experimental data concerning a fluctuation phenomenon which is a problem to be overcome by the present invention.
Figure 7:
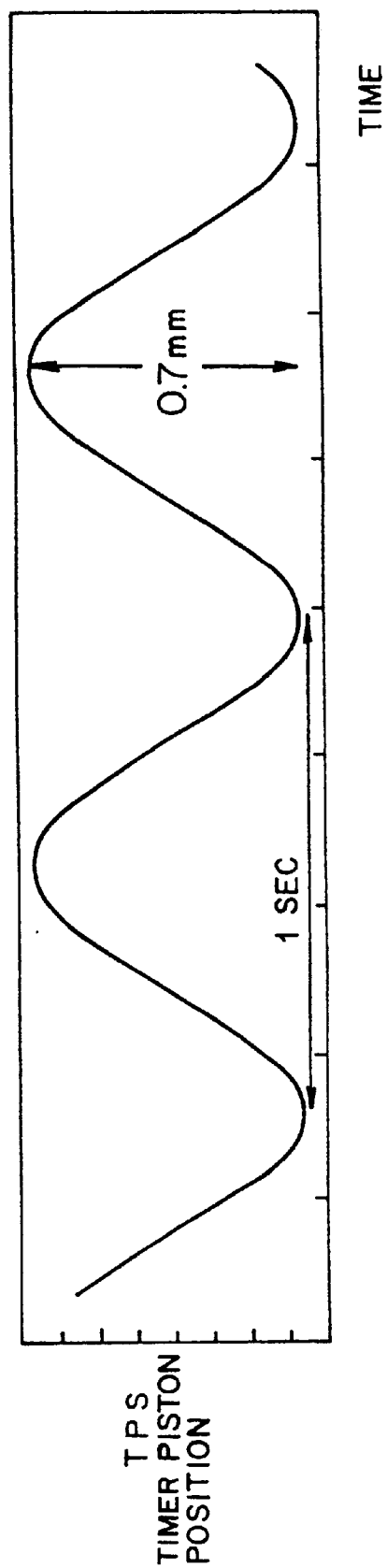
FIG. 7 is a graph showing results of simulation concerning a fluctuation phenomenon which is a problem to be overcome by the present invention.

FIGS. 1 to 3 show, in accordance with an embodiment of the present invention, an engine fuel injection timing control apparatus, which is applicable to a distributor type fuel injection pump based on an electronic control system such as that shown in FIGS. 4, 5(A), and 5(B), as explained above as the prior art. Accordingly, with reference to FIGS. 4, 5(A), and 5(B), this distributor type fuel injection pump will be briefly explained at first.

As shown in FIG. 4, the fuel injection pump equipped with the engine fuel injection timing control apparatus comprises, within a pump main body 10, a vane type feed pump 11 which is rotated by an engine-driven drive shaft 12. The feed pump 11 forcibly feeds fuel from a fuel tank to a pump chamber 13 within the pump main body 10, and further to a fuel forced feed plunger 15 through a passage 14. The passage 14 is provided with a fuel cutting magnet valve 16.

The plunger 15 moves back and forth within a plunger chamber 17. According to the position of the plunger 15, the fuel on the passage 14 side is taken into the plunger chamber 17 and is forcibly fed, by way of a communicating hole 17A, through a passage 18 to a delivery valve 19. Here, each cylinder is provided with the passage 18 and the delivery valve 19. The plunger 15 is driven so as to move back and forth by a cam disc 20 attached to one end thereof.

Namely, the cam disc 20 is urged, by a spring 21 attached to the plunger 15, against a roller 23 which is axially supported by a roller holder 22. When the plunger 15 and the cam disc 20 are rotated by the drive shaft 12, the cam disc 20 moves in the axial direction while being shoved by the roller 23 according to its cam profile, thereby moving the plunger 15 back and forth, thus supplying the fuel at a desired timing.

As shown in FIGS. 5(A) and 5(B), the roller holder 22 is provided with a plurality of rollers 23 (which are four here), and the cam disc 20 has a cam profile corresponding thereto. Consequently, as the cam disc 20 makes one revolution, the plunger 15 is driven four times, whereby, for example, fuel is successively supplied to four cylinders respectively in response to these four driving operations of the plunger 15.

Also provided are not only a control sleeve 24 for fuel injection amount control, and a governor (electric governor here) 25 for controlling the control sleeve 24; but also a regulator valve 26, a sensing gear plate 27 for detecting the rotational speed (number of revolution per unit time) of the drive shaft 12, a fuel temperature sensor 28, and an overflow valve 29, provided with a check valve, for returning excess fuel within the pump chamber 13 to the fuel tank.

Further provided is a timer 30 equipped with a timer piston 31 for changing the position of the roller 23 in its rotating direction. As shown in FIGS. 4, 5(A), and 5(B), the timer piston 31 minutely rotates the roller holder 22 via a piston pin 33 while moving back and forth within a cylinder 32 formed in the pump main body 10.

The timer piston 31 has an intermediate portion to which the piston pin 33 is connected, one end provided with a first pressure chamber 34 into which the fuel pressure within the pump chamber 13 is introduced, and the other end provided with a second pressure chamber 35 into which the intake-side fuel pressure (fuel pressure upstream the feed pump 11) is introduced. Consequently, for example, when the fuel pressure within the first pressure chamber 34 becomes higher than that in the state shown in FIG. 5(A), the timer piston 31 moves to the left in the drawing as shown in FIG. 5(B), whereby the fuel injection timing is adjusted to the advancing side. When the fuel pressure within the first pressure chamber 34 becomes low, by contrast, the timer piston 31 moves to the right in the drawing, whereby the fuel injection timing is adjusted to the retarding side.

Also, the timer piston 31 is provided with a passage 36 through which the pump chamber 13 and the first pressure chamber 34 communicate with each other, and the passage 36 is formed with an orifice 37. Further, disposed within the second pressure chamber 35 is a timer spring 38 for urging the timer piston 31 toward the one end (toward the first pressure chamber 34).

Hence, the position of the timer piston 31 is determined according to the balance among the fuel pressure within the first pressure chamber 34, the fuel pressure within the second pressure chamber 35, and the urging force of the timer spring 36. In the case of this pump, as shown in FIG. 4, there is provided a timing control valve (TCV) 39 which, as a timer controlling solenoid valve, can adjust the pressure balance between the first pressure chamber 34 side and the second pressure chamber 35 side, whereby the fuel injection timing can be adjusted on the basis of various parameters.

The timing control valve 39 is a solenoid valve of electronic control type, whose opening (valve opening time per unit time) is adjusted by duty control. Accordingly, as the timing control valve 39 is duty-controlled, the pressure difference between the pressure on the first pressure chamber 34 side and the pressure on the second pressure chamber 35 side is appropriately adjusted (to the reducing side here) according to the opening of the valve 39, thus regulating the position of the timer piston 31, whereby the fuel injection timing is adjusted.

Such driving of the timing control valve 39 is effected by current control on a timing control valve solenoid (TCV solenoid) 40A such as that shown in FIG. 1. This current control is regulated by an ECU (electronic control unit) 41, as control means, according to a target fuel injection amount Q and an engine rotational speed (i.e., number of engine revolution per unit time, which will be hereinafter referred to as engine speed) Ne. The present fuel injection timing control apparatus is characterized by such driving control of the timing control valve 39, which will be explained after the driving control of the timer piston 31 effected through the ECU 41 is explained with reference to a driving control model of the timer piston 31 shown in FIG. 2.

The position of the timer piston 31 is set where the pressure applied to the higher-pressure first pressure chamber 34 side (pressure as the difference between the pressure within the higher-pressure first pressure chamber 34 and that within the lower-pressure second pressure chamber 35) and the spring force of the timer spring 38 exerted from the lower-pressure second pressure chamber side are in balance with each other. The driving control of the timer piston 31 is effected from such a viewpoint.

Namely, as shown in FIG. 2, assuming that the direction of the pressure acting on the timer piston 31 from the higher-pressure first pressure chamber 34 is positive, pressure P1 within the higher-pressure first pressure chamber 34 (see B1) and original pressure fluctuation (pressure influence of fluctuating feed pump discharge pressure) P3 acting on the first pressure chamber 34 (see B3) are applied thereto in the positive direction, whereas pressure P2 within the lower-pressure second pressure chamber 35 (see B2) is applied thereto in the negative direction.

Also, pressure control amount Pc from the first pressure chamber 34 to the second pressure chamber 35 caused by the timing control valve 39 decreases a positive pressure (see a1) and increases a positive pressure (see a2).

The flow rate of fuel entering the first pressure chamber 34 is in proportion to the square root of the pressure difference between the pump chamber 13 side and the timer cylinder 32 side (first pressure chamber 34 side) (see B5), and is obtained when it is multiplied by the flow coefficient (orifice coefficient) of the orifice 37 (see B6). Similarly, the amount of the fuel flowing out of the timer cylinder 32 side (first pressure chamber 34 side) is in proportion to the square root of the difference between the cylinder pressure and the lower pressure (see B2), while its flow rate changes according to the on/off state of the timing control valve 39 (see B7). The position of the timer piston 31 is determined by these inflow and outflow fuel amounts with respect to the timer cylinder 32.

Consequently, when the timing control valve 39 is controlled so as to change the inflow and outflow fuel amounts with respect to the timer cylinder 32, the piston position changes. Hence, when the on/off ratio (i.e., duty cycle) of the timing control valve 39 is set according to the engine speed Ne and the injection amount Q, the fuel injection timing can be controlled, and the fuel injection timing can further be duty-controlled by detecting the actual fuel injection timing.

For example, further processing operations such as those shown in FIG. 2 (B8 to B15, a3 to a5, d1, and d2) may control the timer piston.

The driving control system for the timing control valve 39 itself by the ECU 41 is configured as shown in FIG. 1.

Namely, the ECU 41 comprises a first frequency signal generating means 42, a second frequency signal generating means 43, a frequency signal switching means 44, a duty cycle determining means 45, a timing control valve control means 46, and a driving circuit 47.

The first frequency signal generating means 42 generates a signal W1 having a first frequency $f_1$ (e.g., 80 Hz), whereas the second frequency signal generating means 43 generates a signal having a second frequency $f_2$ (e.g., 60 Hz) lower than the first frequency $f_1$.

According to the engine speed Ne, the frequency signal switching means 44 selectively outputs the first frequency signal $f_1$ and the second frequency signal $f_2$, which is effected so as to avoid resonance regions between the timing control valve 39 and the engine as shown in FIG. 3. The frequency signal switching means 44 can be constituted by a selecting frequency judging means 44A and a switch 44B which changes over in response to a selecting signal from the selecting frequency judging means 44A. This switching control of frequency signals will be explained later in detail.

The duty cycle determining means 45 determines the duty cycle of the timing control valve (solenoid valve) 39 according to the operation state of the engine, namely, it determines the duty cycle in response to a target position of the timer piston 31 (target piston position) set by a target piston position setting means 48. Here, the target piston position setting means 48 sets the target piston position on the basis of the fuel injection amount (fuel injection time) Q and the engine speed Ne.

In this embodiment, the duty cycle determining means 45 sets an excitation time (on-control time) t1 of a coil 39A of the timing control valve 39 corresponding to the duty cycle, for example, on the basis of a map.

Namely, once a duty cycle is set, the excitation time $t_1$ can be computed as a control period multiplied by this duty cycle. Here, since a first control period corresponding to the first frequency $f_1$ and a second control period corresponding to the second frequency $f_2$ are provided, a first frequency map A corresponding to the first frequency $f_1$ and a second frequency map B corresponding to the second frequency $f_2$ are prepared and appropriately used, so as to set the excitation time $t_1$ corresponding to the duty cycle.

The control means 46 controls the timing control valve 39 on the basis of an on/off signal which has not only the frequency $f_1$ or $f_2$ based on the signal outputted through the frequency signal switching means 44 but also the on/off ratio (i.e., duty cycle) determined by the duty cycle determining means 45.

Accordingly, as shown in FIG. 1, the control means 46 comprises a zero-crossing detector 46A, a triangular wave generator 46B, a comparator 46C, and an AND circuit 46D.

Among them, the zero-crossing detector 46A, which detects zero-crossing of the frequency signal W1, outputs an on signal to the triangular wave generator 46B and the AND circuit 46D when the frequency signal W1 is fed therein, and outputs a detection signal to the triangular wave generator 46B when zero-crossing is detected.

The triangular wave generator 46B generates and outputs a triangular wave signal in response to the on signal from the zero-crossing detector 46A, and this triangular signal is reset by the zero-crossing detection signal.

The comparator 46C compares an output level of the triangular wave signal from the triangular wave generator 46B with an output level of the excitation time signal of the timing control valve 39 determined by the duty cycle determining means 43. It outputs an on signal (excitation signal) when the output level of the triangular wave signal is lower than that of the excitation time signal, whereas it outputs an off signal (excitation terminating signal) when the output level of the triangular wave signal is at least as high as that of the excitation time signal.

Further, the AND circuit 46D outputs an on signal (excitation signal) to the driving circuit 47 when an on signal is outputted from the zero-crossing detector 46A while the comparator 46C outputs an on signal.

The driving circuit 47 comprises a power supply 47A and a transistor 47B. Upon receiving an on signal from the AND circuit 46, the transistor 47B, which functions as a switching circuit, supplies an electric power from the power supply 47A to the coil 39A of the timing control valve 39 so as to excite the coil.

Here, the switching control of frequency signals by the frequency signal switching means 44 will be explained. While the switching control of frequency signals in the frequency signal switching means 44 is effected so as to avoid resonance regions between the timing control valve 39 and the engine as mentioned above, the resonance regions will be explained at first.

Namely, the resonance regions between the timing control valve 39 and the engine exist in the vicinity of points where the driving frequency of the timing control valve coincides with integral multiples of the engine speed Ne. When the driving frequency of the timing control valve is not less than several ten Hz, there are 0.5-order, first-order, and second-order resonance points in a normal engine rotation region (whose upper limit is on the order of 5,000 to 6,000 rpm).

Namely, of the resonance between the timing control valve 39 and the engine, typical is a case where the frequency of pressure fluctuation of the timing control valve 39 applied to the timer piston 31 (i.e., driving frequency) completely coincides with the operating frequency of the reaction force generated when the cam disc runs over. It is the first-order resonance. In the case of a four-cylinder engine, the frequency of the reaction force at the time when the cam disc runs over is twice that of the engine speed Ne, whereby the first-order resonance occurs when the driving frequency of the timing control valve 39 is twice as high as the engine speed Ne.

In addition, the resonance between the timing control valve 39 and the engine also occurs when the pressure fluctuation frequency (driving frequency) of the timing control valve 39 coincides with integral multiples of the run-over reaction force frequency. The second-order resonance refers to the case where the driving frequency of the timing control valve 39 is twice that of the run-over reaction force frequency. In the case of a four-cylinder engine, the second-order resonance occurs when the driving frequency of the timing control valve 39 is four times as high as the engine speed Ne.

Further, in addition, the resonance between the timing control valve 39 and the engine occurs when the run-over reaction force frequency of the cam disc coincides with integral multiples of the driving frequency of the timing control valve 39. The 0.5-order resonance refers to the case where the run-over reaction force frequency is twice that of the driving frequency of the timing control valve 39 (in other words, where the driving frequency of the timing control valve 39 is 0.5 times that of the run-over reaction force frequency). In the case of a four-cylinder engine, the 0.5-order resonance occurs when the driving frequency of the timing control valve 39 coincides with the engine speed Ne.

Figure 9:
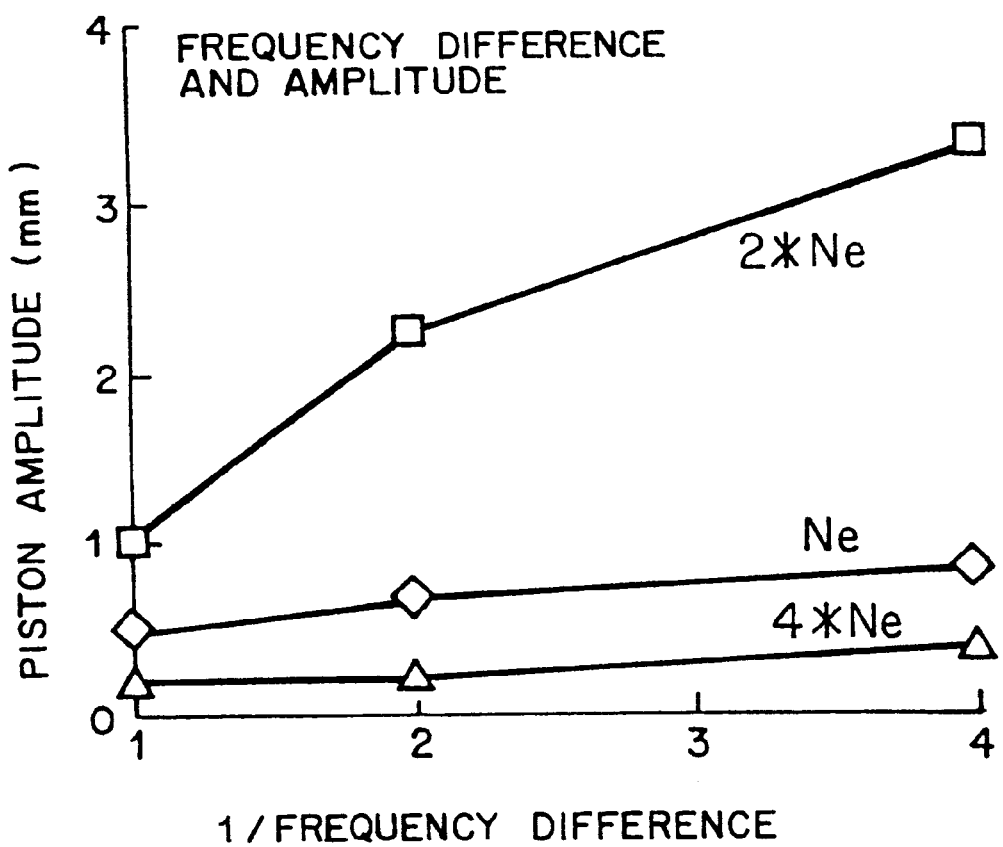
FIG. 9 is a view showing an amplitude characteristic of a timer piston upon the fluctuation phenomenon with respect to the frequency difference between the driving frequency of the timing control valve and the engine rotation for each control frequency of the timing control valve.

The "fluctuation phenomenon" generated in the timer piston 31 becomes problematic at these 0.5-order, first-order, and second-order resonance points. In particular, as already explained with reference to FIG. 9, the piston amplitude caused by the "fluctuation phenomenon" in the first-order resonance region is substantially twice as large as that of the 0.5-order resonance region, and substantially four times as large as that of the second-order resonance region.

Therefore, in order to respond to such characteristics, the frequency signal switching means 44 switches frequency signals such that the "fluctuation phenomenon" in the first-order resonance region is eliminated in preference to that in the 0.5-order and second-order resonance regions.

Also, the lower the frequency is, the greater becomes the amplitude of fluctuation of the timer piston in the resonance regions of the same-order. Accordingly, the frequency signal switching means 44 avoids the resonance region in the case where the driving frequency is low (i.e., case of the second frequency) in preference to the case where the driving frequency is high (i.e., case of the first frequency).

Specifically, as shown in FIG. 3, the frequency signal switching means 44 switches frequency signals at signal switching engine speeds (hereinafter referred to as switching speeds) $N_1$, $N_2$, $N_3$, $N_4$, and $N_5$. Namely, when the engine speed Ne detected by the selecting frequency judging means 44A in response to the detection information from a speed sensor (engine rotational speed detecting means) 49 for detecting the engine speed coincides with any of the switching speeds $N_1$ to $N_5$, the frequency signals are switched.

Of the switching speeds $N_1$ to $N_5$, the switching speed $N_1$ (third switching engine rotational speed) is disposed in the 0.5-order resonance region, the switching speed $N_2$ (second switching engine rotational speed) is disposed between the 0.5-order and first-order resonance regions, the switching speed $N_3$ (fourth switching engine rotational speed) is disposed in the first-order resonance region, the switching speed $N_4$ (first switching engine rotational speed) is disposed between the first-order and second-order resonance regions, and the switching speed $N_5$ (fifth switching engine rotational speed) is disposed in the second-order resonance region.

Also, the frequency signals are switched such that the first frequency $f_1$ is used when the engine speed Ne is less than $N_1$, the second frequency $f_2$ is used when the engine speed Ne is at least $N_1$ but less than $N_2$, the first frequency $f_1$ is used when the engine speed Ne is at least $N_2$ but less than $N_3$, the second frequency $f_2$ is used when the engine speed Ne is at least $N_3$ but less than $N_4$, the first frequency $f_1$ is used when the engine speed Ne is at least $N_1$ but less than $N_5$, and the second frequency $f_2$ is used when the engine speed Ne is at least $N_5$.

In particular, the individual switching speeds $N_1$, $N_2$, $N_3$, $N_4$, and $N_5$ are set as follows.

Namely, assuming that the engine speeds at the 0.5-order, first-order, and second-order resonance points in the first frequency $f_1$ are respectively $N_{11}$, $N_{12}$, and $N_{13}$, and that the engine speeds at the 0.5-order, first-order, and second-order resonance points in the second frequency $f_2$ are respectively $N_{21}$, $N_{22}$, and $N_{23}$; differences $L_1$, $L_2$, $L_3$, $L_4$, $L_5$, $U_1$, $U_2$, $U_3$, $U_4$, and $U_5$ are formed between the switching speeds $N_1$, $N_2$, $N_3$, $N_4$, and $N_5$ and their adjacent resonance engine speeds $N_{11}$, $N_{12}$, $N_{13}$, $N_{21}$, $N_{22}$, and $N_{23}$. Here, these differences $L_1$, $L_2$, $L_3$, $L_4$, $L_5$, $U_1$, $U_2$, $U_3$, $U_4$, and $U_5$ can be defined as represented by the following expressions:

$$L_1 = N_1 - N_{21}$$

$$L_2 = N_{22} - N_2$$

$$L_3 = N_3 - N_{22}$$

$$L_4 = N_{23} - N_4$$

$$L_5 = N_5 - N_{23}$$

$$U_1 = N_{11} - N_1$$

$$U_2 = N_2 - N_{11}$$

$$U_3 = N_{12} - N_3$$

$$U_4 = N_4 - N_{12}$$

$$U_5 = N_{13} - N_5$$

Also, the switching speeds $N_1$, $N_2$, $N_3$, $N_4$, and $N_5$ are set so that such differences $L_1$, $L_2$, $L_3$, $L_4$, $L_5$, $U_1$, $U_2$, $U_3$, $U_4$, and $U_5$ satisfy the following expressions:

$$N_1 : L_1 > U_1 \tag{1}$$

$$N_2 : L_2 > U_2 \tag{2}$$

$$N_3 : L_3 > U_3 \tag{3}$$

$$N_4 : U_4 > L_4 \tag{4}$$

$$N_5 : L_5 > U_5 \tag{5}$$

Among them, condition (1) concerning the setting of the switching speed $N_1$, condition (3) concerning the setting of the switching speed $N_3$, and condition (5) concerning the setting of the switching speed $N_5$ are provided in order to attain a greater margin (speed difference, i.e., rotational speed difference) in the second frequency $f_2$ of the lower driving frequency than in the first frequency $f_1$ of the higher driving frequency in the case of the same-order resonance regions, so as to eliminate the former frequency from the resonance region more preferentially.

Also, condition (2) concerning the setting of the switching speed $N_2$ and condition (4) concerning the setting of the switching speed $N_4$ are provided in order to attain a greater margin (speed difference, i.e., rotational speed difference) in the case of the first-order resonance region than in the 0.5-order and second-order resonance regions, so as to avoid the former resonance region more preferentially.

Of course, the switching speeds $N_1$, $N_2$, $N_3$, $N_4$, and $N_5$ cannot be determined by such conditions alone. In practice, based on these conditions, each of the ratio of $L_1$ to $U_1$, ratio of $L_2$ to $U_2$, ratio of $L_3$ to $U_3$, ratio of $L_4$ to $U_4$, and ratio of $L_5$ to $U_5$ is set so that the magnitude of amplitude of the timer piston 31 is substantially uniformly lowered by the "fluctuation phenomenon." Such setting can appropriately be effected on the basis of test data.

Since the fuel injection timing control apparatus in accordance with an embodiment of the present invention is configured as mentioned above, when injecting the fuel, while setting a fuel injection timing and a fuel injection time (injection amount) by the ECU 41, it drives the fuel injection valve according to thus set fuel injection timing and fuel injection time.

Though the fuel injection timing is controlled by the positional adjustment of the timer piston 31, such positional adjustment is effected by adjusting the oil pressure (fuel pressure) applied to the timer piston 31 while the timing control valve 39 is duty-controlled.

This control of the timing control valve 39 is effected through the timer control valve control means 46 as follows.

Namely, at the time of this control, the signal (first frequency signal) W1 having the first frequency $f_1$ is emitted from the first frequency generating means 42, whereas the signal (second frequency signal) W2 having the second frequency $f_2$ lower than the first frequency $f_1$ is emitted from the second frequency generating means 43. Then, the frequency signal switching means 44 selectively outputs the first frequency signal W1 from the first frequency signal generating means 42 and the second frequency signal W2 from the second frequency signal generating means 43 while switching between them according to such a characteristic as that shown in FIG. 3 in response to the engine speed Ne.

On the other hand, the duty cycle determining means 45 determines a duty cycle according to the target position of the timer piston 31 (target piston position) and further sets, on the basis of a map corresponding to the frequency selected by the frequency signal switching means 44, the excitation time $t_1$ of the timing control valve 39 with respect to the duty cycle and the driving period.

Then, the control means 46 receives from the duty cycle determining means 45 an excitation signal corresponding to the excitation time, thereby outputting an on signal for the duration of the excitation time $t_1$ in each excitation period, thereby exciting the coil 39A of the timing control valve 39 through the driving circuit 47.

Consequently, the timing control valve 39 is regulated to a desired opening (time-average opening) so that the position of the timer piston 31 is appropriately adjusted, whereby a desired fuel injection timing is attained.

A kind of beat phenomenon known as the "fluctuation" of the timer piston 31 is generated when the driving frequency of the timing control valve 39 approaches a resonance region with respect to the engine speed as mentioned above. In the present apparatus, as shown in FIG. 3, when the frequency signal W1 approaches its resonance region, the frequency signal is switched to the second frequency signal W2 that is relatively separated from this resonance region; and when the frequency signal W2 approaches its resonance region, on the other hand, the frequency signal is switched to the first frequency signal W1 that is relatively separated from this resonance region. Consequently, the driving frequency of the timing control valve 39 does not approach the resonance region with respect to the engine speed, whereby the "fluctuation" of the timer piston 31 is eliminated or, if any, is suppressed to a small amplitude. Of course, the resonance itself is eliminated.

In particular, though the "fluctuation" in the first-order resonance region is generated with an amplitude greater than that in the 0.5-order or second-order resonance region; since the elimination of the first-order resonance region is effected in preference to that of the 0.5-order and second-order resonance regions according to condition (2) concerning the setting of the switching speed $N_2$ and condition (4) concerning the setting of the switching speed $N_4$, the "fluctuation" in the first-order resonance region is securely suppressed in response to the highest demand existing there.

Further, though the "fluctuation" in the second frequency $f_2$ of a lower driving frequency is likely to occur with an amplitude greater than that in the "fluctuation" in the first frequency $f_1$ of a higher driving frequency in the case of the same-order resonance regions; since the elimination of the second frequency $f_2$ of the lower driving frequency from the resonance regions is effected in preference to that of the first frequency $f_1$ of the higher driving frequency in the case of the same-order resonance regions according to condition (1) concerning the setting of the switching speed $N_1$, condition (3) concerning the setting of the switching speed $N_3$, and condition (5) concerning the setting of the switching speed $N_5$, the "fluctuation" in the case of a lower driving frequency can securely be suppressed in response to a higher demand existing there.

When the "fluctuation" is thus suppressed, the amplitude of vibration of the timer piston 31 caused by the "fluctuation" decreases, thereby allowing a sufficient accuracy in control of the fuel injection timing to be secured, thus advantageously being capable of contributing to improving engine performances.

Also, the "fluctuation" can securely be suppressed by the switching control of only two kinds of driving frequencies, whereby the configuration of the control system can be simplified in terms of either hardware or software.

Further, the above-mentioned frequency switching speeds $N_1$ to $N_5$ can securely be set when "fluctuation" generating characteristics are detected by a test and the like.

Capability of Exploitation in Industry

When the present invention is used for controlling an engine fuel injection pump, such as a diesel-engine fuel injection pump, which can control a fuel injection timing by adjusting the position of a timer piston via a solenoid valve, the fluctuation phenomenon of the timer piston occurring due to a relationship between the driving frequency of the timer controlling solenoid valve and the engine speed can be suppressed by simple control. Consequently, changes in the fuel injection timing caused by the fluctuation in the timer piston can be suppressed easily, whereby the fuel injection timing can be controlled accurately. Accordingly, it can contribute to improving engine performances. Its utility is therefore considered to be extremely high.

I claim:

1. In an engine fuel injection control apparatus comprising:

a timer (30) for changing a fuel injection timing of an engine injecting fuel from a fuel injection valve by moving a timer piston (31) in response to an oil pressure supplied thereto and a timer controlling solenoid valve (39) for adjusting the oil pressure supplied to said timer (30) as being opened and closed by a driving signal having a duty cycle which is set according to an operation state of said engine, in which a resonance occurring in said timer piston (31) between driving by said timer controlling solenoid valve (39) and a fluctuation accompanying a rotation of said engine is eliminated by a change in frequency of the driving signal of said the timer controlling solenoid valve (39);

an engine fuel injection timing control apparatus comprising:

first frequency signal generating means (42) for generating and emitting a signal (W1) having a first frequency ($f_1$), second frequency signal generating means (43) for generating and emitting a signal (W2) having a second frequency ($f_2$) which is lower than said first frequency ($f_1$), engine rotational speed detecting means (49) for detecting a rotational speed (Ne) of said engine, frequency signal switching means (44) for selectively outputting said first frequency signal (W1) emitted from said first signal generating means (42) and said second frequency signal (W2) emitted from said second signal generating means (43) according to the engine rotational speed (Ne) detected by said engine rotational speed detecting means (49), and control means (46), having a driving frequency based on the frequency signal outputted from said frequency signal switching means (44), for controlling said timer controlling solenoid valve (39) by using the driving signal having the duty cycle that is set according to the operation state of said engine, wherein said frequency signal switching means (44) is configured so as to change over between said first frequency signal (W1) and said second frequency signal (W2) according to a preset signal switching engine rotational speed ($N_1$, $N_2$, $N_3$, $N_4$, $N_5$), and wherein said signal switching engine rotational speed ($N_1$, $N_2$, $N_3$, $N_4$, $N_5$) is set to a level which yields a first predetermined rotational speed difference ($U_1$, $U_2$, $U_3$, $U_4$, $U_5$) from an engine rotational speed ($N_{11}$, $N_{12}$, $N_{13}$) where said resonance is generated with respect to said first frequency ($f_1$) and a second predetermined rotational speed difference ($L_1$, $L_2$, $L_3$, $L_4$, $L_5$) from an engine rotational speed ($N_{21}$, $N_{22}$, $N_{23}$) where said resonance is generated with respect to said second frequency ($f_2$).

2. The engine fuel injection timing control apparatus of claim 1, wherein said signal switching engine rotational speed ($N_4$) is disposed between a first-order resonance region which is an engine rotational speed region where said resonance becomes a first-order resonance and a second-order resonance region which is an engine rotational speed region where said resonance becomes a second-order resonance, and wherein said frequency signal switching means (44) outputs said second frequency signal (W2) and said first frequency signal (W1) respectively in an engine rotational speed region on said first-order resonance region side of said signal switching engine rotational speed ($N_4$) and in an engine rotational speed region on said second-order resonance region side of said signal switching engine rotational speed ($N_4$).

3. The engine fuel injection timing control apparatus of claim 2, wherein said signal switching rotational speed ($N_4$) is set such that a rotational speed difference ($U_4$) from a first-order resonance engine rotational speed ($Nl_{12}$) where said first-order resonance occurs with respect to said first frequency ($f_1$) is greater than a rotational speed difference ($L_4$) from a second-order resonance engine rotational speed ($N_{23}$) where said second-order resonance occurs with respect to said second frequency ($f_2$).

4. The engine fuel injection timing control apparatus of claim 1, wherein said signal switching engine rotational speed ($N_2$) is disposed between a 0.5-order resonance region which is an engine rotational speed region where said resonance becomes a 0.5-order resonance and a first-order resonance region which is an engine rotational speed region where said resonance becomes a first-order resonance, and wherein said frequency signal switching means (44) outputs said second frequency signal (W2) and said first frequency signal (W1) respectively in an engine rotational speed region on said 0.5-order resonance region side of said signal switching engine rotational speed ($N_2$) and in an engine rotational speed region on said first-order resonance region side of said signal switching engine rotational speed ($N_2$).

5. The engine fuel injection timing control apparatus of claim 4, wherein said signal switching rotational speed ($N_2$) is set such that a rotational speed difference ($L_2$) from a first-order resonance engine rotational speed ($N_{22}$) where said first-order resonance occurs with respect to said second frequency ($f_2$) is greater than a rotational speed difference ($U_2$) from a 0.5-order resonance engine rotational speed ($N_{11}$) where said 0.5-order resonance occurs with respect to said first frequency ($f_1$).

6. The engine fuel injection timing control apparatus of claim 1, wherein said signal switching engine rotational speed ($N_1$, $N_3$, $N_5$) is disposed between a first N-order resonance engine rotational speed ($N_{11}$, $N_{12}$, $N_{13}$) where an N-order resonance is generated with respect to said first frequency ($f_1$) and a second N-order resonance engine rotational speed ($N_{21}$, $N_{22}$, $N_{23}$) where an N-order resonance is generated with respect to said second frequency ($f_2$), and wherein said frequency signal switching means (44) outputs said first frequency signal (W1) and said second frequency signal (W2) respectively in an engine rotational speed region on the lower rotational speed region side of said signal switching engine rotational speed ($N_1$, $N_3$, $N_5$) and in an engine rotational speed region on the higher rotational speed region side of said signal switching engine rotational speed ($N_1$, $N_3$, $N_5$).

7. The engine fuel injection timing control apparatus of claim 6, wherein said signal switching rotational speed ($N_1$, $N_3$, $N_5$) is set such that a rotational speed difference ($L_1$, $L_3$, $L_5$) from said second N-order resonance engine rotational speed ($N_{21}$, $N_{22}$, $N_{23}$) is greater than a rotational speed difference ($U_1$, $U_3$, $U_5$) from said first N-order resonance engine rotational speed ($N_{11}$, $N_{12}$, $N_{13}$).

8. The engine fuel injection timing control apparatus of claim 6, wherein said N is an integer.

9. The engine fuel injection timing control apparatus of claim 7, wherein said N is an integer.

10. The engine fuel injection timing control apparatus of claim 6, wherein said N is 0.5.

11. The engine fuel injection timing control apparatus of claim 7, wherein said N is 0.5.

12. The engine fuel injection timing control apparatus of claim 6, wherein said N is any of 0.5 and integers.

13. The engine fuel injection timing control apparatus of claim 7, wherein said N is any of 0.5 and integers.

14. The engine fuel injection timing control apparatus of claim 1,
wherein said signal switching engine rotational speed comprises:
a first signal switching engine rotational speed ($N_4$) disposed between a first-order resonance region which is an engine rotational speed region where said resonance becomes a first-order resonance and a second-order resonance region which is an engine rotational speed region where said resonance becomes a second-order resonance, and
a second signal switching engine rotational speed ($N_2$) disposed between a 0.5-order resonance region which is an engine rotational speed region where said resonance becomes a 0.5-order resonance and a first-order resonance region which is an engine rotational speed region where said resonance becomes a first-order resonance; and
wherein said frequency signal switching means (44) outputs said second frequency signal (W2) in an engine rotational speed region on said first-order resonance region side of said first signal switching engine rotational speed ($N_4$) and in an engine rotational speed region on said 0.5-order resonance region side of said second signal switching engine rotational speed ($N_2$), and outputs said first frequency signal (W1) in an engine rotational speed region on said second-order resonance region side of said first signal switching engine rotational speed ($N_4$) and in an engine rotational speed region on said first-order resonance region side of said second signal switching engine rotational speed ($N_2$).

15. The engine fuel injection timing control apparatus of claim 14,
wherein said first signal switching engine rotational speed ($N_4$) is set such that a rotational speed difference ($U_4$) from a first-order resonance engine rotational speed ($N_{12}$) where said first-order resonance occurs with respect to said first frequency ($f_1$) is greater than a rotational speed difference ($L_4$) from a second-order resonance engine rotational speed ($N_{23}$) where said second-order resonance occurs with respect to said second frequency ($f_2$), and
wherein said second signal switching rotational speed ($N_2$) is set such that a rotational speed difference ($L_2$) from a first-order resonance engine rotational speed ($N_{22}$) where said first-order resonance occurs with respect to said second frequency ($f_2$) is greater than a rotational speed difference ($U_2$) from a 0.5-order resonance engine rotational speed ($N_{11}$) where said 0.5-order resonance occurs with respect to said first frequency ($f_1$).

16. The engine fuel injection timing control apparatus of claim 1,
wherein said signal switching engine rotational speed ($N_1$, $N_2$, $N_3$, $N_4$, $N_5$) comprises:
a first signal switching engine rotational speed ($N_4$) disposed between a first-order resonance region which is an engine rotational speed region where said resonance becomes a first-order resonance and a second-order resonance region which is an engine rotational speed region where said resonance becomes a second-order resonance,
a second signal switching engine rotational speed ($N_2$) disposed between a 0.5-order resonance region which is an engine rotational speed region where said resonance becomes a 0.5-order resonance and a first-order resonance region which is an engine rotational speed region where said resonance becomes a first-order resonance,
a third signal switching engine rotational speed ($N_1$) disposed between a first 0.5-order resonance engine rotational speed ($N_{11}$) where a 0.5-order resonance is generated with respect to said first frequency ($f_1$) and a second 0.5-order resonance engine rotational speed ($N_{21}$) where a 0.5-order resonance is generated with respect to said second frequency ($f_2$),
a fourth signal switching engine rotational speed ($N_3$) disposed between a first first-order resonance engine rotational speed ($N_{12}$) where a first-order resonance is generated with respect to said first frequency ($f_1$) and a second first-order resonance engine rotational speed ($N_{22}$) where a first-order resonance is generated with respect to said second frequency ($f_2$), and
a fifth signal switching engine rotational speed ($N_5$) disposed between a first second-order resonance engine rotational speed ($N_{13}$) where a second-order resonance is generated with respect to said first frequency ($f_1$) and a second second-order resonance engine rotational speed ($N_{23}$) where a second-order resonance is generated with respect to said second frequency ($f_2$); and
wherein said frequency signal switching means (44) outputs said second frequency signal (W2) in an engine rotational speed region between said third signal switching engine rotational speed ($N_1$) and said second signal switching engine rotational speed ($N_2$) and in an engine rotational speed region between said fourth signal switching engine rotational speed ($N_3$) and said first signal switching engine rotational speed ($N_4$), and outputs said first frequency signal (W1) in an engine rotational speed region between said second signal switching engine rotational speed ($N_2$) and said fourth signal switching engine rotational speed ($N_3$) and an engine rotational speed region between said first signal switching engine rotational speed ($N_4$) and said fifth signal switching engine rotational speed ($N_5$).

17. The engine fuel injection timing control apparatus of claim 16,
wherein said first signal switching engine rotational speed ($N_4$) is set such that a rotational speed difference ($U_4$) from the first-order resonance engine rotational speed ($N_{12}$) where said first-order resonance occurs with respect to said first frequency ($f_1$) is greater than a rotational speed difference ($L_4$) from the second-order resonance engine rotational speed ($N_{23}$) where said second-order resonance occurs with respect to said second frequency ($f_2$),
wherein said second signal switching rotational speed ($N_2$) is set such that a rotational speed difference ($L_2$) from the first-order resonance engine rotational speed ($N_{22}$) where said first-order resonance occurs with respect to said second frequency ($f_2$) is greater than a rotational speed difference ($U_2$) from the 0.5-order resonance engine rotational speed ($N_{11}$) where said 0.5-order resonance occurs with respect to said first frequency ($f_1$), wherein said third signal switching rotational speed ($N_1$) is set such that a rotational speed difference ($L_1$) from said second 0.5-order resonance engine rotational speed ($N_{21}$) is greater than a rotational speed difference ($U_1$) from said first 0.5-order resonance engine rotational speed ($N_{11}$), wherein said fourth signal switching rotational speed ($N_3$) is set such that a rotational speed difference ($L_3$) from said second first-order resonance engine rotational speed ($N_{22}$) is greater than a rotational speed difference ($U_3$) from said first first-order resonance engine rotational speed ($N_{12}$), and wherein said fifth signal switching rotational speed ($N_5$) is set such that a rotational speed difference ($L_5$) from said second second-order resonance engine rotational speed ($N_{23}$) is greater than a rotational speed difference ($U_5$) from said first second-order resonance engine rotational speed ($N_{13}$).

18. The engine fuel injection timing control apparatus of claim 16, wherein said frequency signal switching means (44) outputs said first frequency signal (W1) in an engine rotational speed region on the lower rotational speed side of said third signal switching engine rotational speed ($N_1$).

19. The engine fuel injection timing control apparatus of claim 16, wherein said frequency signal switching means (44) outputs said second frequency signal (W2) in an engine rotational speed region on the higher rotational speed side of said fifth signal switching engine rotational speed ($N_5$).

* * * * *